US012743856B2

(12) United States Patent
Yoon et al.

(10) Patent No.: US 12,743,856 B2
(45) Date of Patent: Sep. 22, 2026

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Sukun Yoon, Suwon-si (KR); Jinho Kim, Suwon-si (KR); Hyungsuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 18/197,906

(22) Filed: May 16, 2023

(65) Prior Publication Data

US 2023/0290087 A1 Sep. 14, 2023

Related U.S. Application Data

(63) Continuation of application No. PCT/KR2022/010027, filed on Jul. 11, 2022.

(30) Foreign Application Priority Data

Sep. 13, 2021 (KR) ........................ 10-2021-0121997

(51) Int. Cl.
*G06T 19/00* (2011.01)
*G06T 3/60* (2024.01)
(Continued)

(52) U.S. Cl.
CPC .............. *G06T 19/006* (2013.01); *G06T 3/60* (2013.01); *G06V 10/25* (2022.01); *H04N 23/698* (2023.01)

(58) Field of Classification Search
CPC ...... G06F 3/00; G06F 3/04817; G06F 3/0486; G06T 19/006; G06T 3/60; G09B 29/00;
(Continued)

(56) References Cited

U.S. PATENT DOCUMENTS 9,651,928 B2 5/2017 Sasaki et al.
10,623,897 B1 * 4/2020 Wu ....................... H04W 4/021
(Continued)

FOREIGN PATENT DOCUMENTS

CA 3058602 A1 4/2020
EP 2 625 541 B1 3/2015
(Continued)

OTHER PUBLICATIONS

Extended European Search Report issued Sep. 6, 2024 for European Patent Application No. 22867529.4.
(Continued)

*Primary Examiner* — Ming Wu
(74) *Attorney, Agent, or Firm* — STAAS & HALSEY LLP

(57) ABSTRACT

An electronic apparatus including a user interface, a camera, a memory, and a processor. The electronic apparatus receives an input of a first user command for generating a map showing arrangement state of at least one device existing in a specific region, based on the first user command being input, obtains an image by capturing the specific region and the at least one device through a camera, obtains information associated with a size and a shape of the specific region based on the image, obtains identification information and arrangement information for the at least one device by recognizing the at least one device included in the image, and generates a map for the specific region based on the information on the size and the shape of the specific region and the identification information and the arrangement information for the at least one device.

15 Claims, 17 Drawing Sheets

(51) Int. Cl.
*G06V 10/25* (2022.01)
*H04N 23/698* (2023.01)

(58) Field of Classification Search
CPC ........ G06V 10/25; G06V 10/46; G06V 20/20; H04N 23/635; H04N 23/64; H04N 23/698
See application file for complete search history.

(56) References Cited

U.S. PATENT DOCUMENTS

| | | | | |
|---|---|---|---|---|
| 11,288,510 | B2 | 3/2022 | Williams, Jr. et al. | |
| 11,605,207 | B2 | 3/2023 | Narita et al. | |
| 2015/0193416 | A1* | 7/2015 | Hagiwara | G06F 40/169 715/202 |
| 2017/0115941 | A1 | 4/2017 | Kim et al. | |
| 2017/0223808 | A1* | 8/2017 | Barna | H05B 47/1995 |
| 2019/0266293 | A1 | 8/2019 | Ishida et al. | |
| 2021/0004933 | A1* | 1/2021 | Wong | G06T 3/4038 |
| 2021/0027538 | A1 | 1/2021 | Bleyer et al. | |
| 2021/0064216 | A1 | 3/2021 | Li et al. | |
| 2021/0142564 | A1 | 5/2021 | Impas et al. | |
| 2022/0108533 | A1 | 4/2022 | Narita et al. | |

FOREIGN PATENT DOCUMENTS

| | | | |
|---|---|---|---|
| EP | 2 179 600 | B1 | 7/2015 |
| EP | 3 459 688 | B1 | 2/2021 |
| JP | 2008-077261 | A | 4/2008 |
| JP | 2017-187981 | | 10/2017 |
| JP | 2020-095517 | | 6/2020 |
| KR | 10-2016-0003553 | | 1/2016 |
| KR | 10-2016-0117143 | | 10/2016 |
| KR | 10-1791738 | B1 | 10/2017 |
| KR | 10-2018-0107845 | | 10/2018 |
| KR | 10-2019-0012599 | | 2/2019 |
| KR | 10-2020-0036055 | | 4/2020 |
| WO | WO 2020/166352 | A1 | 8/2020 |

OTHER PUBLICATIONS

International Search Report dated Nov. 2, 2022 in International Patent Application No. PCT/KR2022/010027.
PCT/ISA/237 dated Nov. 2, 2022 in International Patent Application No. PCT/KR2022/010027.
Korean Office Action dated Feb. 5, 2026 issued by the Korean Patent Office for Korean Patent Application No. 10-2021-0121997.
Examination Report dated May 29, 2026 issued by the European Patent Office for European Patent Application No. 22867529.4.

* cited by examiner

400

ELECTRONIC APPARATUS AND METHOD FOR CONTROLLING THEREOF

CROSS-REFERENCE TO RELATED APPLICATIONS

This application is a continuation application, under 35 U.S.C. § 111(a), of International Patent Application No. PCT/KR2022/010027, filed on Jul. 11, 2022, which claims priority under 35 U.S.C. 119 to Korean Patent Application No. 10-2021-0121997, filed on Sep. 13, 2021, in the Korean Intellectual Property Office, the disclosures of which are incorporated herein by reference in their entirety.

BACKGROUND

1. Field

The present disclosure relates to an electronic apparatus and a method for controlling thereof. More particularly, the present disclosure relates to an electronic apparatus capable of generating a map by recognizing a specific region by camera capturing and a method for controlling thereof.

2. Description of Related Art

The electronic apparatus may classify and display a list of devices of Internet of Things (IoT) registered on a server existing in a house by each of a specific region where each IoT device is located, and provide a user state information and control information of the IoT devices. In addition, the classification for each specific region such as a living room, a bedroom, a kitchen, a bathroom, and the like which are specific regions in the house may be provided to the user in a form of a text list, and may also be provided to the user in a form of a floor map illustrating the specific regions in the house.

In a case of providing the user the IoT devices and the specific regions in the house in a form of the floor map, the electronic apparatus may provide a floor map in which locations of the IoT devices in the specific regions in the house are applied using location information of the IoT devices, and the user may correct locations of the IoT devices, locations of the specific regions in the house, or locations of the specific regions in the house through a user interface.

Herein, in the related art, information on conceptual specific regions and IoT devices was provided to the user in a text form or an image of a random specific region, and accordingly, there was a limit in providing the user a map of all specific regions including accurate information on actual specific regions and devices such as a shape of a specific region in a house, a corner of a specific region, a height of a specific region, a width of a specific region, and a location where a device is disposed.

SUMMARY

According to an embodiment for achieving the above object, the electronic apparatus including a user interface, a camera, a memory, a processor. The processor may be configured to, based on a user request being input through the user interface, obtain an image, captured through the camera, corresponding to a specific region and at least one device through the camera, obtain information corresponding to the specific region and identification information and arrangement information for the at least one device included in the image based on the image, and provide a map corresponding to the specific region based on the information corresponding to the specific region and the identification information and the arrangement information for the at least one device.

The processor may be configured to obtain a panorama image of the specific region and the at least one device by panorama scan through the camera.

The processor is configured to obtain curve information of the panorama image, and obtain information associated with a shape of the specific region by recognizing at least one of a corner of the specific region, a height of the specific region, and a width of the specific region based on the obtained curve information of the panorama image.

The processor is configured to, based on the curve information of the panorama image, as a region showing a first curvature in the specific region, obtain an actual width of the region to be smaller than a width of the region which is included in the panorama image, and based on the curve information of the panorama image, as a region showing a second curvature in the specific region, obtain the actual width of the region to be greater than the width of the region which is included in the panorama image.

The processor may be configured to obtain an augmented reality image of the specific region and the at least one device by augmented reality scan through the camera.

The processor may be configured to obtain information associated with a corner of the specific region by performing the augmented reality scan of the corner of the specific region through the camera, based on information of a floor of the specific region being scanned through the camera, obtain information associated with an area of the floor and a size and a shape of the specific region based on a pattern of the floor, and obtain the information associated with the size and the shape of the specific region based on a route of the camera while the image corresponding to the specific region is captured and a shape of a wall recognized through the camera.

The processor may be configured to generate a map at a visual angle of a user by a corner rotation method for setting a random point at a center of the specific region obtained as the augmented reality image and rotating the specific region or the at least one device in the obtained image around a virtual axis that vertically passes through the floor of the specific region obtained as the augmented reality image while passing through the random point.

The processor may be configured to, based on the at least one device being scanned through the camera, perform control to output information associated with the at least one device by identifying the at least one device based on pre-trained data, and where the user request is a first request and the map is a first map, based on a second user request corresponding to the output information being input, provide a second map corresponding to the specific region based on identification information and arrangement information for the at least one device.

The electronic apparatus may further include a display, the processor may be configured to control the display to output a map, and the output map may include at least one of information associated with a temperature of the specific region, a quality of air in the specific region, and a lighting of the specific region.

The map may include an outline showing information associated with a size and a shape of the specific region and an icon showing arrangement information of the at least one device, and the processor may be configured to correct the information associated with the size and the shape of the specific region based on user's dragging of the outline of the specific region, and correct the arrangement information of the at least one device based on user's dragging of the icon.

According to another embodiment, there is provided a method for controlling an electronic apparatus, the method including, based on a user request being input through a user interface, obtaining an image, captured through the camera, corresponding to a specific region and at least one device through a camera, obtaining information corresponding to the specific region and identification information and arrangement information for the at least one device included in the image based on the image, and providing a map corresponding to the specific region based on the information corresponding to the specific region and the identification information and the arrangement information for the at least one device.

The obtaining the image may include obtaining a panorama image of the specific region and the at least one device by panorama scan through the camera.

Information associated with the size and the shape of the specific region is obtained and may include obtaining curve information of the panorama image, and obtaining information associated with a shape of the specific region by recognizing at least one of a corner of the specific region, a height of the specific region, and a width of the specific region based on the obtained curve information of the panorama image.

The obtaining the information associated with the size and the shape of the specific region may include, based on the curve information of the panorama image, as a region showing a first curvature in the specific region, obtaining an actual width of the region to be smaller than a width of a region which is included in the panorama image, and based on the curve information of the panorama image, as the region showing a second curvature in the specific region, obtaining the actual width of the region to be greater than the width of the region which is included in the panorama image.

The obtaining the image may include obtaining an augmented reality image of the specific region and the at least one device by augmented reality scan through the camera.

The obtaining the information associated with the size and the shape of the specific region may include obtaining information associated with a corner of the specific region by performing the augmented reality scan of the corner of the specific region through the camera, based on information of a floor of the specific region being scanned through the camera, obtaining information associated with an area of the floor and a size and a shape of the specific region based on a pattern of the floor, and obtaining the information associated with the size and the shape of the specific region based on a route of the camera and a shape of a wall recognized through the camera.

The obtaining the information associated with the size and the shape of the specific region may include generating a map at a visual angle of the user by a corner rotation method for setting a random point at a center of the specific region obtained as the augmented reality image and rotating the recognized specific region or the at least one device on the obtained image around a virtual axis that vertically passes through the floor of the specific region obtained as the augmented reality image while passing through the random point.

The providing the map may include, based on the at least one device being scanned through the camera, performing control to output information associated with the at least one device by identifying the device based on pre-trained data, where the user request is a first request and based on a second user request corresponding to the output information being input, providing a map corresponding to the specific region based on identification information and arrangement information for the at least one device.

The control method may further include controlling the display to output the map, and the output map may include at least one of information associated with a temperature of the specific region, a quality of air in the specific region, and a lighting of the specific region.

The map may include an outline showing information associated with a size and a shape of the specific region and an icon showing arrangement information of the at least one device, and the control method may further include correcting the information associated with the size and the shape of the specific region based on user's dragging of the outline of the specific region, and correcting the arrangement information of the at least one device based on user's dragging of the icon.

DETAILED DESCRIPTION

Figure 1:
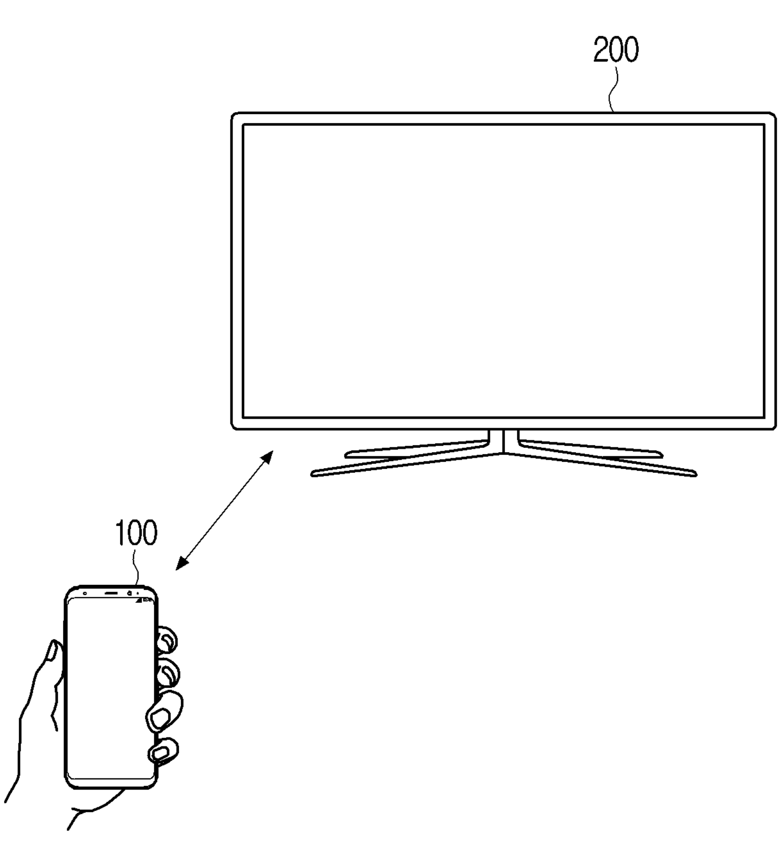
FIG. 1 is a diagram illustrating an operation of an electronic apparatus and a display apparatus according to an embodiment.

The embodiments of the present disclosure may be diversely modified. Accordingly, specific exemplary embodiments are illustrated in the drawings and are described in detail in the detailed description. However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

In describing the disclosure, when it is determined that the detailed description of the known function or configuration may obscure the gist of the embodiments, the detailed description thereof will be omitted.

In addition, the embodiments may be changed in various forms, and therefore, the technical scope of the disclosure is not limited to the following embodiments. Rather, the embodiments are provided to complete the disclosure and completely transfer the technical idea of the disclosure to those skilled in the art.

The terms used herein are solely intended to explain a specific embodiment, and not to limit the scope of the present disclosure. Unless otherwise defined specifically, a singular expression may encompass a plural expression.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and another element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level.

Under certain circumstances, the term "device configured to" may refer to "device capable of" doing something together with another device or components. For example, the phrase "a unit or a processor configured (or set) to perform A, B, and C" may refer, for example, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

In the embodiments disclosed herein, a term 'module' or 'unit' refers to an element that performs at least one function or operation. The 'module' or 'unit' may be realized as hardware, software, or combinations thereof. In addition, a plurality of 'modules' or 'units' may be integrated into at least one module and may be realized as at least one processor in an integrated manner except for 'modules' or 'units' that should be realized in specific hardware.

The disclosure is made to improve the afore-mentioned problems, and an object of the disclosure is to provide an electronic apparatus which generates a floor map of specific regions in a house including accurate information on actual specific regions and devices and provides sizes and shapes of the specific regions, and identification information and arrangement information of devices existing in the specific regions, and a method for controlling thereof.

The object of the disclosure is to generate a floor map of a specific region in a house including accurate and detailed information on the actual specific region in the house and accurate information on devices, provide a user a shape of the specific region, a height of the specific region, a width of the specific region, a temperature of the specific region, quality of air in the specific region, lighting of the specific region, identification information of devices existing in the specific region, and arrangement information of the devices, and allow the user to simply control a state of the specific region and the devices existing in the specific region.

Meanwhile, various elements and areas in the drawings are schematically illustrated. Therefore, the technical spirit of the disclosure is not limited by comparative sizes or intervals illustrated in the accompanying drawings.

Hereinafter, with reference to the accompanying drawings, the embodiments of the disclosure will be described in detail for those skilled in the art to easily practice the embodiments.

FIG. 1 is a diagram illustrating an operation of an electronic apparatus and a display apparatus according to an embodiment.

The electronic apparatus 100 may include, for example, at least one of a smartphone, a tablet personal computer (PC), a laptop personal computer (PC), a netbook computer, a mobile medical device, and a wearable device, but is not limited thereto. Accordingly, there is no limitation, although FIG. 1 illustrates an embodiment in which the electronic apparatus 100 is implemented as a smartphone.

An external electronic apparatus 200 may be implemented as various apparatuses capable of reproducing an image content by including, for example, a smart TV, a tablet, a monitor, a desktop computer, a laptop computer, and the like. The external electronic apparatus 200 according to an embodiment of the present disclosure is not limited to the above apparatuses and the external electronic apparatus 200 may be implemented as the external electronic apparatus 200 having two or more functions of the apparatuses described above.

Referring to FIG. 1, the electronic apparatus 100 may communicate with the external electronic apparatus 200 to configure a floor map generation system 10 for providing a generated floor map to a user.

The electronic apparatus 100 may generate a floor map showing arrangement information for at least one device in a specific region using an image captured through a camera. In this case, the floor map is shown in a viewpoint of a 2D floor map that is seen from the top of specific regions in a house and may include information on sizes and shapes of the specific regions and identification information and arrangement information of the device in the house. The electronic apparatus 100 may store the floor map therein or transmit the floor map to the external electronic apparatus 200 so that the external electronic apparatus 200 displays the floor map stored in an external server.

The external electronic apparatus 200 may display the floor map received from the electronic apparatus 100. In this case, in a state where the floor map is displayed on the external electronic apparatus 200, the information on the specific regions and the devices displayed on the floor map may be corrected through an input through the electronic apparatus 100 or an input to the external electronic apparatus 200.

In addition, according to another embodiment of the disclosure, the external electronic apparatus 200 is not limited to an apparatus including a display therein, but may include an apparatus not including a display device as an internal constituent element or an apparatus including only a simple display for user notification or the like. Herein, the image may be output to another display apparatus such as a separate external electronic apparatus TV or monitor through video/audio output ports (not illustrated) provided in the external electronic apparatus 200. In such a case where the image is output to the other display apparatus such as a separate TV or monitor, the external electronic apparatus 200 may be provided with separate video/audio output ports (not illustrated) or may include a communication interface for transmitting a signal to the other display apparatus such as separate external TV or monitor through wired/wireless communication. In this case, a processor 190 of the electronic apparatus 100 may control a communication interface (not illustrated) of the external electronic apparatus 200 so that the external electronic apparatus 200 transmits a signal for performing control so that a content or UI is output to the other display apparatus such as separate external TV or monitor, in order to output a content or a UI.

Figure 2:
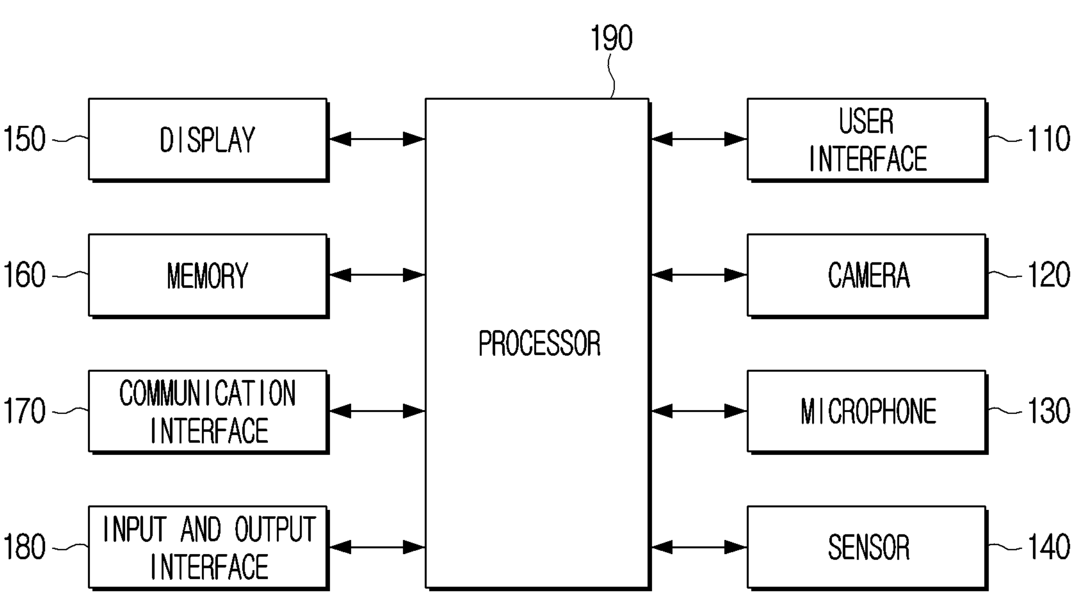
FIG. 2 is a block diagram illustrating a configuration of the electronic apparatus according to an embodiment.

FIG. 2 is a block diagram illustrating a configuration of the electronic apparatus according to an embodiment.

The electronic apparatus 100 may include the apparatuses described with reference to FIG. 1 and may be implemented as the electronic apparatus 100 having two or more functions of the apparatuses. The electronic apparatus 100 may be connected to an external apparatus to perform an operation for one or more functions or may be implemented with interaction of two or more apparatuses, as illustrated in FIG. 1.

In addition, the electronic apparatus 100 according to various embodiments of the disclosure may include a user interface 110, a camera 120, a microphone 130, a sensor 140, a display 150, a memory 160, a communication interface 170, and the processor 190.

The user interface 110 may include a button, a lever, a switch, or a touch type interface, and specifically, the touch type interface may be implemented by a method for receiving an input of a user's touch on a screen of the display 150 of the electronic apparatus 100.

Through the user interface 110, a user command (user request) for floor map generation may be input and, specifically, an input for controlling an operation of the camera 120 which performs operations of panorama scan and augmented reality scan may be received. In addition, through the user interface 110, a user touch a user drag for floor map correction may be input.

The camera 120 may capture a still image and a moving image. The camera 120 according to various embodiments of the disclosure may include one or more lenses, an image sensor, an image signal processor, and a flash. The one or more lenses may include a telephoto lens, a wide angle lens, and a super wide angle lens disposed on a surface of the electronic apparatus 100, and may also include a three-dimensional (3D) depth lens.

The camera 120 may be disposed on a surface (e.g., rear surface) of the electronic apparatus 100, but is not limited to such a configuration, and various embodiments according to the disclosure may be implemented through connection with the camera 120 existing separately on the outside of the electronic apparatus 100.

The electronic apparatus 100 may obtain a panorama image or an augmented reality image through the panorama scan or the augmented reality scan of the camera 120 for the specific region in the house. The electronic apparatus 100 may obtain information on curves of the specific region in the house through the panorama scan of the camera 120 and obtain information on a corner of the specific region, a ceiling of the specific region, and a floor of the specific region. In addition, the electronic apparatus 100 may obtain the information on the floor of the specific region in the house by the augmented reality scan through the camera 120, and obtain information on an area of the floor or a shape of the floor by floor pattern scan through the camera 120. In addition, the electronic apparatus 100 may obtain information on a wall of the specific region in the house in the augmented reality scan process through the camera 120.

The microphone 130 may refer to a device which detects a sound and converts the sound into an electrical signal. For example, the microphone 130 may detect a voice in real time and convert the detected voice into an electrical signal, and the electronic apparatus 100 may perform an operation corresponding to the electrical signal. The microphone 130 may include a TTS module or an STT module.

The microphone 130 may not only include a microphone that is included as one constituent element of the electronic apparatus 100, but also include a microphone that is included as one constituent element of a remote control (not illustrated) for controlling the external electronic apparatus 200.

Specifically, the microphone 130 may detect a voice including a user command for the floor map generation and convert the voice including the user command into an electrical signal, and the electronic apparatus 100 may control the operation of the camera 120 for the panorama scan and the augmented reality scan based on the electrical signal. In addition, based on the microphone 130 being included as one constituent element of the remote control (not illustrated) for controlling the external electronic apparatus 200, operations of the panorama scan, the augmented reality scan, the map generation, the map correction, and the like may be performed through the external electronic apparatus 200 by a user command input through the microphone 130 provided in the remote control.

The remote control (not illustrated) of the electronic apparatus 100 or the external electronic apparatus 200 may include the microphone 130 and may have a configuration of converting a voice for voice recognition into an electrical signal.

Another embodiment of the disclosure may include a case where a remote control application is installed on the electronic apparatus 100 to detect a user voice command through the microphone 130 and perform operations of the panorama scan, the augmented reality scan, the map generation, the map correction, and the like through a voice recognition function.

The sensor 140 may detect a state of the electronic apparatus 100 (e.g., movement) or an external environment state (e.g., user state) and generate an electrical signal or a data value corresponding to the detected state. The sensor 140 may include, for example, a gesture sensor and an acceleration sensor.

The sensor 140 may be configured with a gesture sensor and the electronic apparatus 100 may perform the floor map generation operation by detecting a predetermined user gesture for the floor map generation. In addition, the electronic apparatus 100 may detect the user's gesture through the gesture sensor through the sensor 140 and obtain a panorama image or an augmented reality image through the panorama scan or the augmented reality scan of the camera 120 based on identification information for the user's gesture.

The sensor 140 may be configured with an accelerometer sensor and may detect a movement while the camera 120 of the electronic apparatus 100 moves in a direction parallel to the floor from a specific point during the panorama scan process of the camera 120, and the electronic apparatus 100 may obtain an acceleration value for the movement of the camera 120. Based on the movement of the electronic apparatus 100 being performed vertically, instead of in parallel to the floor, or is excessively rapid, the electronic apparatus 100 may display information necessary for performing the proper panorama scan on the screen of the display 150 based on the obtained acceleration value.

The display 150 may include various types of display panels such as a liquid crystal display (LCD) panel, an organic light emitting diode (OLED) panel, an active-matrix organic light-emitting diode (AM-OLED), liquid crystal on silicon (LcoS), a quantum dot light-emitting diode (QLED), a digital light processing (DLP), a plasma display panel (PDP), an inorganic LED panel, a micro LED panel, and the like, but is not limited thereto. Meanwhile, the display 150 may configure a touch screen along with a touch panel and may be formed of a flexible panel.

Each step for the floor map generation may be displayed on the display 150. Specifically, an initial screen for receiving an input of a first user command for the floor map generation, a camera capturing screen for the panorama scan or the augmented reality scan, a floor map including a size and a shape of a specific region, identification information or arrangement information of a device, or information on a temperature of a specific region, quality of the air of the specific region, and light of the specific region, and a screen for correcting the generated floor map may be displayed. In addition, weather information and time information may be displayed along with the floor map.

The memory 160 may store various programs or data temporarily or non-temporarily and transfer the stored information to the processor 190 according to calling of the processor 190. In addition, the memory 160 may store various pieces of information necessary for computation, process, or control operation of the processor 190 in an electric format.

The memory 160 may include, for example, at least one of a main memory unit and an auxiliary memory unit. The main memory unit may be implemented using a semiconductor storage medium such as a ROM and/or a RAM. The ROM may include, for example, a ROM, an EPROM, an EEPROM, and/or a MASK-ROM. The RAM may include, for example, a DRAM and/or a SRAM. The auxiliary memory unit may be implemented using at least one storage medium capable of permanently or semi-permanently storing data such as a flash memory device, a secure digital (SD) card, a solid state drive (SSD), a hard disc drive (HDD), a magnetic drum, an optical recording medium such as a compact disk (CD), a DVD, or a laser disk, a magnetic tape, a magneto-optical disk and/or floppy disk.

The memory 160 may store information on a basic specific region configuration of a floor map generation initial stage. In addition, the memory may store the panorama image and the augmented reality image captured through the camera 120 in the floor map generation process, and store the size and the shape of the specific region, and the identification information and the arrangement information of the device obtained through the image. The memory 160 may store curve information of the panorama image, information necessary to recognize a corner of the specific region in the house, information on a floor pattern recognition method, and information on a corner rotation method. The memory 160 may store the generated floor map. Based on the electronic apparatus 100 including the gesture sensor, the memory 160 may store information on the user gesture for the floor map generation.

The communication interface 170 may include a wireless communication interface, a wired communication interface, and an input interface. The wireless communication interface may perform communication with various external apparatuses using a wireless communication technology or a mobile communication technology. Examples of such wireless communication technology include Bluetooth, Bluetooth Low Energy, CAN communication, Wi-Fi, Wi-Fi Direct, ultrawide band (UWB) communication, Zigbee, Infrared Data Association (IrDA) communication, Near Field Communication (NFC), and the like, and examples of the mobile communication technology include 3GPP, Wi-Max, Long Term Evolution (LTE), 5G, and the like. The wireless communication interface may be implemented using an antenna, a communication chip and substrate, and the like capable of transmitting electromagnetic waves to outside or receiving the electromagnetic waves transferred from the outside. The wired communication interface may perform communication with various external apparatuses based on a wired communication network. Herein, the wired communication network may be implemented using a physical cable, for example, a pair cable, a coaxial cable, an optical fiber cable, or an Ethernet cable. Any one of the wireless communication interface and the wireless communication interface may be omitted according to the embodiment. Accordingly, the electronic apparatus 100 may include only the wireless communication interface or the wired communication interface. In addition, the electronic apparatus 100 may include an integrated communication interface which supports both wireless connection by the wireless communication interface and wired connection by the wired communication interface.

The communication interface 170 may perform communication connection of the electronic apparatus 100 with the external electronic apparatus 200 or perform communication connection with an external server. Specifically, the electronic apparatus 100 may transmit and display the floor map including the size and the shape of the specific region and the identification information and the arrangement information of the device to the external electronic apparatus 200 through the communication interface 170. In addition, the communication interface 170 may perform the communication connection with the external server and the electronic apparatus 100 may obtain the identification information for a device registered on the server.

The electronic apparatus 100 is not limited to include one communication interface 170 for performing one method of the communication connection, and may include a plurality of communication interfaces 170 for Wi-Fi Direct, Bluetooth, and infrared communication.

The electronic apparatus 100 may perform communication connection with an external server, an external apparatus, or the like through the communication interface 170. In addition, the external apparatus may perform communication connection for video/audio data transmission.

The electronic apparatus 100 may include an input and output interface 180 for allowing the electronic apparatus to be connected to the external electronic apparatus 200 or another apparatus provided separately, for example, an external storage apparatus. For example, the input and output interface 180 may be a universal serial bus (USB) terminal and may be any one of a High Definition Multimedia Interface (DMI), a Mobile High-Definition Link (MHL), a Universal Serial Bus (USB), a Display Port (DP), Thunderbolt, a Video Graphics Array (VGA) port, an RGB port, D-subminiature (D-SUB), and Digital Visual Interface (DVI). The input and output interface 160 may input and output at least one of audio and video signals. According to an implementation example, the input and output interface 180 may include a port for inputting and outputting only an audio signal and a port for inputting and outputting only a video signal as separate ports, or may be implemented as one port for inputting and outputting both an audio signal and a video signal.

The input and output interface 180 may include one constituent element of the external electronic apparatus 200.

The electronic apparatus 100 or the external electronic apparatus 200 may be connected to an external apparatus, an external display, a speaker, and the like to transmit and receive video/audio signals through the input and output interface 180.

The processor 190 may control the overall operation of the electronic apparatus 100. Specifically, the processor 190 may be connected to a configuration of the electronic apparatus 100 including the memory 160 described above, and execute at least one instruction stored in the memory 160 described above, thereby generally controlling the operation of the electronic apparatus 100. Particularly, the processor 190 may be implemented as one processor 190 and may also be implemented as a plurality of processor 190.

In addition, the processor 190 may be implemented by various methods. For example, the controller 190 may be implemented as at least one of an Application-Specific Integrated Circuit (ASIC), an embedded processor, a microprocessor, hardware control logic, hardware Finite State Machine (FSM), and a Digital Signal Processor (DSP). Meanwhile, the processor 190 in the disclosure may include one or more of a central processing unit (CPU), a microcontroller unit (MCU), a microprocessing unit (MPU), a controller, an application processor (AP), or a communication processor (CP), and an ARM processor for processing a digital signal or may be defined as the corresponding term. In addition, the processor 130 may be implemented as System on Chip (SoC) or large scale integration (LSI) including the processing algorithm or may be implemented in form of a field programmable gate array (FPGA). The processor 190 may perform various functions by executing computer executable instructions stored in the memory 160. In addition, in order to perform an artificial intelligence function, the processor 190 may include at least one of a graphics-processing unit (GPU), a neural processing unit (NPU), and a visual processing unit (VPU) which are separate AI dedicated processors.

The processor 190 may receive an input of a first user command for generating a map showing an arrangement state of at least one device of home appliances such as a TV, a washing machine, an air conditioner, a dryer, and the like existing in the specific region such as a living room, a bedroom, a kitchen, a bath room, and the like through the user interface 110, the microphone 130, or the sensor 140. Based on the first user command being input, the processor 190 may obtain an image by capturing the specific region and the at least one device through the camera. The processor 190 may obtain information on a size and a shape of the specific region by recognizing a corner of the specific region based on the obtained image. For a circular or elliptical specific region with no corner, information on the specific region through a separate user input may be obtained. The information on the size and the shape of the specific region may include information on a height of the specific region and a width of the specific region. The processor 190 may obtain the identification information and the arrangement information for the at least one device by recognizing the at least one device included in the image. The identification information for the device may be stored in the memory 160 or the external server as described above. The processor 190 may generate a map for the specific region based on the information on the size and the shape of the specific region and the identification information and the arrangement information for the at least one device. The processor 190 may display the generated map by transmitting information on the generated map to the external electronic apparatus 200 through the communication interface 170.

The floor map according to various embodiments of the disclosure may be displayed on the display 150 of the electronic apparatus 100 or the external electronic apparatus 200, and may be displayed with information on a temperature of the specific region, quality of the air in the specific region, and lighting of the specific region on the displayed map.

The processor 190 may display the information on the temperature of the specific region using a color of each specific region on the floor map. The color of each specific region on the floor map may include red, orange, yellow, green, blue, and purple. As the temperature of the specific region is high, the processor 190 may display the color of the specific region on the floor map as a reddish color, and as the temperature of the specific region is low, the processor may display the color of the specific region on the floor map as a bluish color.

The processor 190 may display the information on the quality of the air in the specific region as one item of a plurality of items formed of excellent, normal, bad, and the like on the floor map.

The processor 190 may display the information on the lighting of the specific region as one item of a plurality of items formed of on and off on the floor map.

A method for displaying the information on the temperature of the specific region, the quality of the air in the specific region, and the lighting of the specific region on the floor map by the processor 190 is not limited to the above embodiment, and may be implemented by various methods such as a color, a character, a picture, an icon, and the like.

The floor map generated by the processor 190 may include an outline showing the information on the size and the shape of the specific region and icons showing the arrangement information of the device, and the processor 190 may correct the information on the size and the shape of the specific region based on user's dragging for the outline of the specific region and correct the arrangement information of the device based on the user's dragging for the icon. The processor 190 may receive an input of the user command for correcting the floor map by a method of the user gesture or the user's voice.

The specific control method of the electronic apparatus 100 by the processor 190 will be described with reference to FIGS. 3 and 13.

Figure 3:
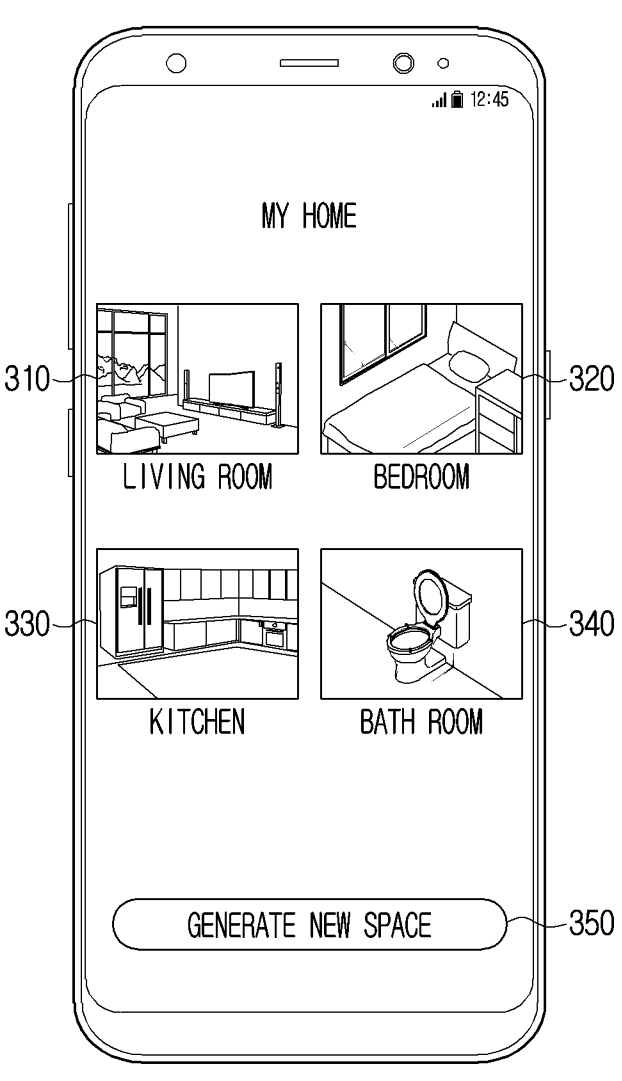
FIG. 3 is a diagram illustrating a floor map generation method according to various embodiments.

FIG. 3 is a diagram illustrating a floor map generation method according to various embodiments.

Referring to FIG. 3, the processor 190 may display an initial screen for the floor map generation on the display 150. A title of a floor map to be generated may be displayed on an upper portion of an initial screen, and the title of the floor map may be generated with information referring to a specific region shown by the floor map as "my home".

In addition, one or more items each formed of a graphic item showing a basic specific region and a title of the basic specific region may be displayed as graphic user interfaces (GUI) 310, 320, 330, and 340 on the initial screen. The items showing the basic specific region may be formed of the GUI 310 corresponding to a living room, the GUI 320 corresponding to a bedroom, the GUI 330 corresponding to a kitchen, and the GUI 340 corresponding to a bath room, and may include various life specific regions without limitation thereto. In addition, the information on the basic specific region formed of one or more items on the initial screen may be displayed as a basic floor map with random sizes and arrangement. The processor 190 may receive an input of a first user command through the GUIs 310, 320, 330, and 340 formed of the basic specific region items of the living room, the bedroom, the kitchen, and the bath room. The first user command may be generated by a method with a user touch. Based on the input of the first user command being received through the GUI for one specific region of the GUIs 310, 320, 330, and 340 formed of the basic specific region items of the living room, the bedroom, the kitchen, and the bath room, the processor 190 may obtain an image for the specific region and devices through the panorama scan or the augmented reality scan of the camera 120 and obtain the size and the shape of the specific region and the identification information or the arrangement information of the devices.

Referring to FIG. 3, the processor 190 may display a GUI 350 capable of receiving the input of the first user command for generating the floor map on the display 150 based on the panorama image or the augmented reality image obtained by capturing a new specific region other than the basic specific region formed of the living room, the bedroom, the kitchen, and the bath room with the camera 120. The GUI may include guide information such as "generate new specific region" for guiding the first user command. Based on the input of the first user command being received through the GUI 350, the processor 190 may control the camera 120 so that the camera 120 performs the panorama scan or the augmented reality scan operation.

Figure 4:
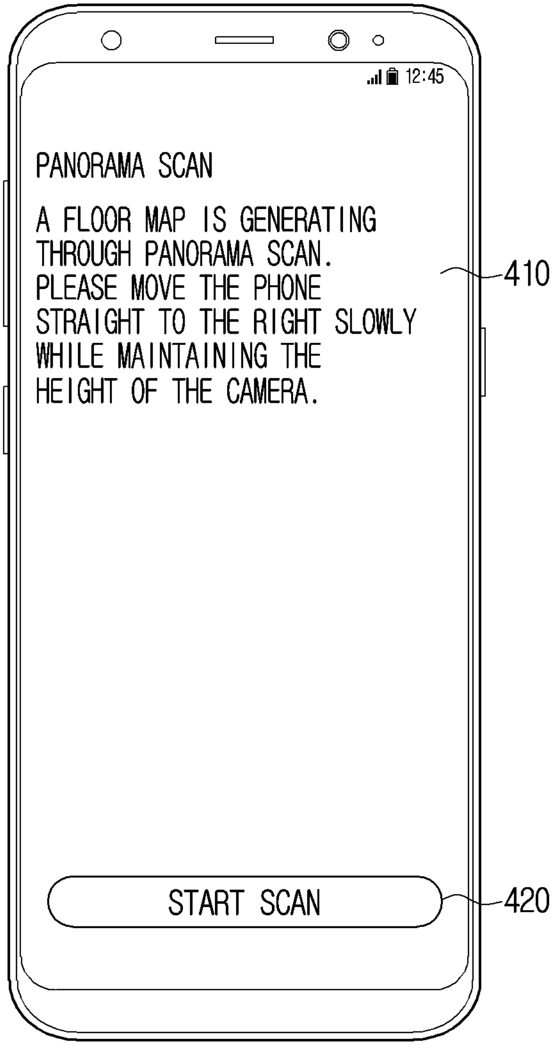
FIG. 4 is a diagram illustrating the floor map generation method through panorama scan according to various embodiments.

FIG. 4 is a diagram illustrating the floor map generation method through panorama scan according to various embodiments.

Based on the input of the first user command being received through the GUIs 310, 320, 330, and 340 formed of the basic specific region items of the living room, the bedroom, the kitchen, and the bath room or the GUI 350 for generating a new specific region other than the basic specific regions on the initial screen for the floor map generation according to FIG. 3, the processor 190, referring to FIG. 4, may display guide information 410 for panorama scan on the display 150 before the camera 120 performs the panorama scan. The guide information 410 is not limited to the above sentence and may include other guide sentence. In addition, the processor 190 may display a GUI 420 capable of receiving an input of a user command for the panorama scan start on the same screen. Based on the input of the user command for the panorama scan start being received through the GUI 420, the processor 190 may control the camera 120 so that the camera 120 performs the panorama scan operation. In addition, the processor 190 may receive an input of the user command for the panorama scan start in a form of the user gesture or the user's voice.

Figure 5:
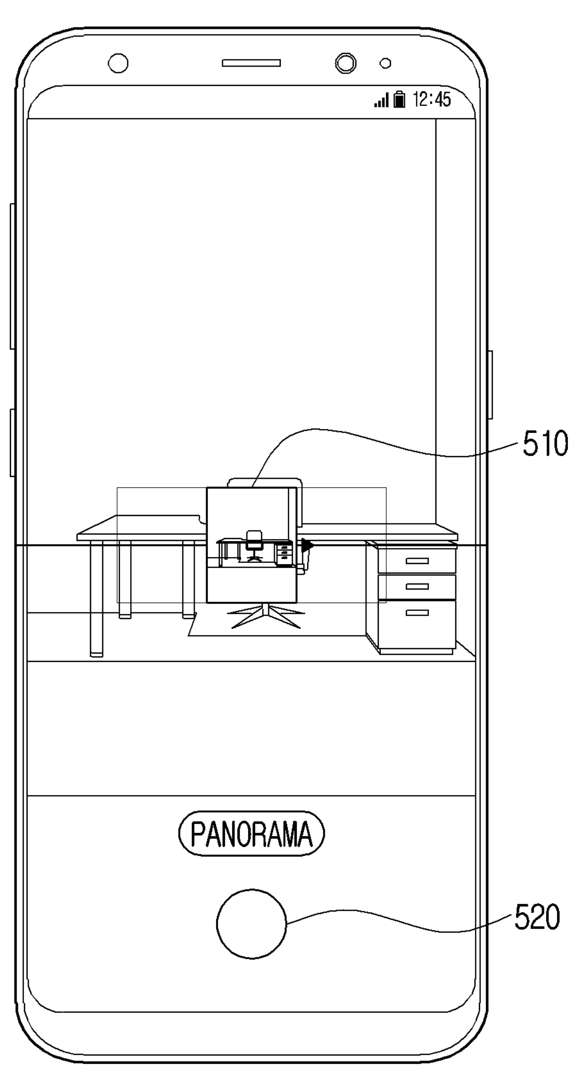
FIG. 5 is a diagram illustrating the floor map generation method through panorama scan according to various embodiments.

FIG. 5 is a diagram illustrating the floor map generation method through panorama scan according to various embodiments.

Based on the processor 190 receiving the input of the user command for the panorama scan start through the GUI 420 on the screen of the display 150 illustrated in FIG. 4, the processor 190, referring to FIG. 5, may display a panorama scan screen of the camera 120 on the display 150.

Referring to FIG. 5, the processor 190 may display a captured image corresponding to a direction to which a lens of the camera 120 currently faces on the display 150 as the entire screen, and display a panorama scan guide line 510 showing, in real time, which part of the entire panorama image the captured image corresponding to the direction to which the lens of the camera 120 currently faces shows at the center of the display 150. In addition, the processor 190 may display a GUI 520 for receiving an input of a user command for performing the panorama scan operation of the camera 120 on the display 150.

Based on the input of the user command for the panorama scan being received through the GUI 520, the processor 190 may control the camera 120 so that the camera 120 performs the panorama scan operation. In addition, the processor 190 may receive an input of the user command in a form of the user gesture or the user's voice through the sensor 140. Based on the camera 120 moving to the left or the right in a direction parallel to a floor of a current specific region based on the panorama scan guide line 510, the processor 190 may obtain one panorama image by combining a plurality of images obtained by continuous capturing.

Figure 6A:
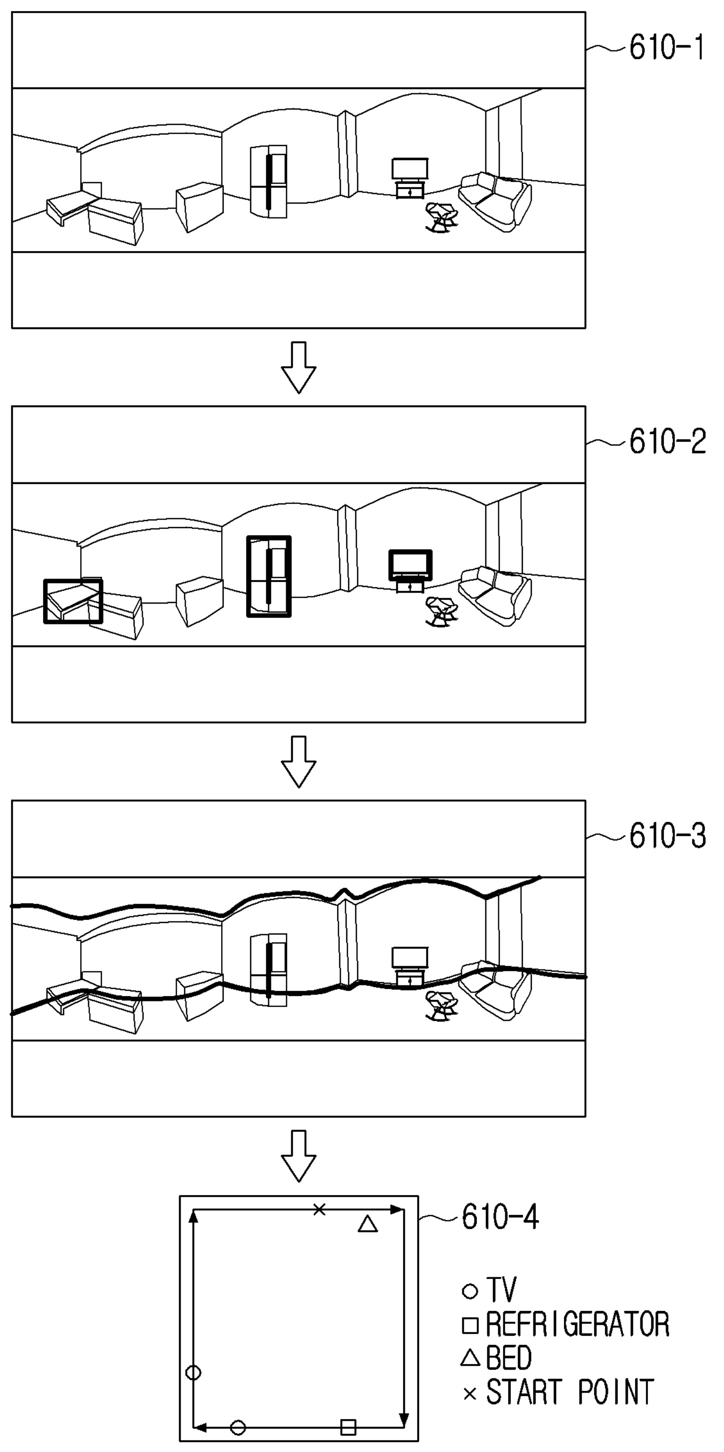
FIG. 6A is a diagram illustrating the floor map generation method through panorama scan according to an embodiment.

FIG. 6A is a diagram illustrating the floor map generation method through panorama scan according to an embodiment.

Referring to FIG. 6A, the processor 190 may obtain one panorama image 610-1 through the panorama scan of the camera 120. The processor 190 may obtain identification information 610-2 for devices or objects such as a TV, a refrigerator, and a bed based on the obtained panorama image 610-1. In addition, the processor 190 may obtain information 610-3 on a boundary line of a wall and a ceiling and a boundary line of the wall and a floor based on the panorama image 610-1 and obtain curve information of the panorama image 610-1 based on this. The processor 190 may obtain the information on the shape of the specific region and the arrangement information of the devices by recognizing corners of the specific region, a height of the specific region, and a width of the specific region based on the curve information of the panorama image, and generate a floor map 610-4 in a form of view of the specific region seen from the top based on the obtained information. The processor 190 may show the devices or objects such as the TV, the refrigerator, and the bed as a plurality of icons different from each other on the floor map 610-4, and display the arrangement and location information of the devices and objects in the corresponding specific region on the floor map 610-4. In addition, the processor 190 may display an icon showing a point where the camera 120 starts the panorama scan and information on the continuous capturing direction in the panorama scan process of the camera 120 in a form of arrows on the floor map 610-4. The arrows may be displayed on just inside of an outline of the specific region shown on the floor map 610-4. The shape of the specific region seen from the top displayed on the floor map 610-4 is not limited to a square and may be a polygon. Based on the shape of the view of the specific region seen from the top being a circle or an ellipse, information on the shape of the specific region may be obtained through another user input.

Figure 6B:
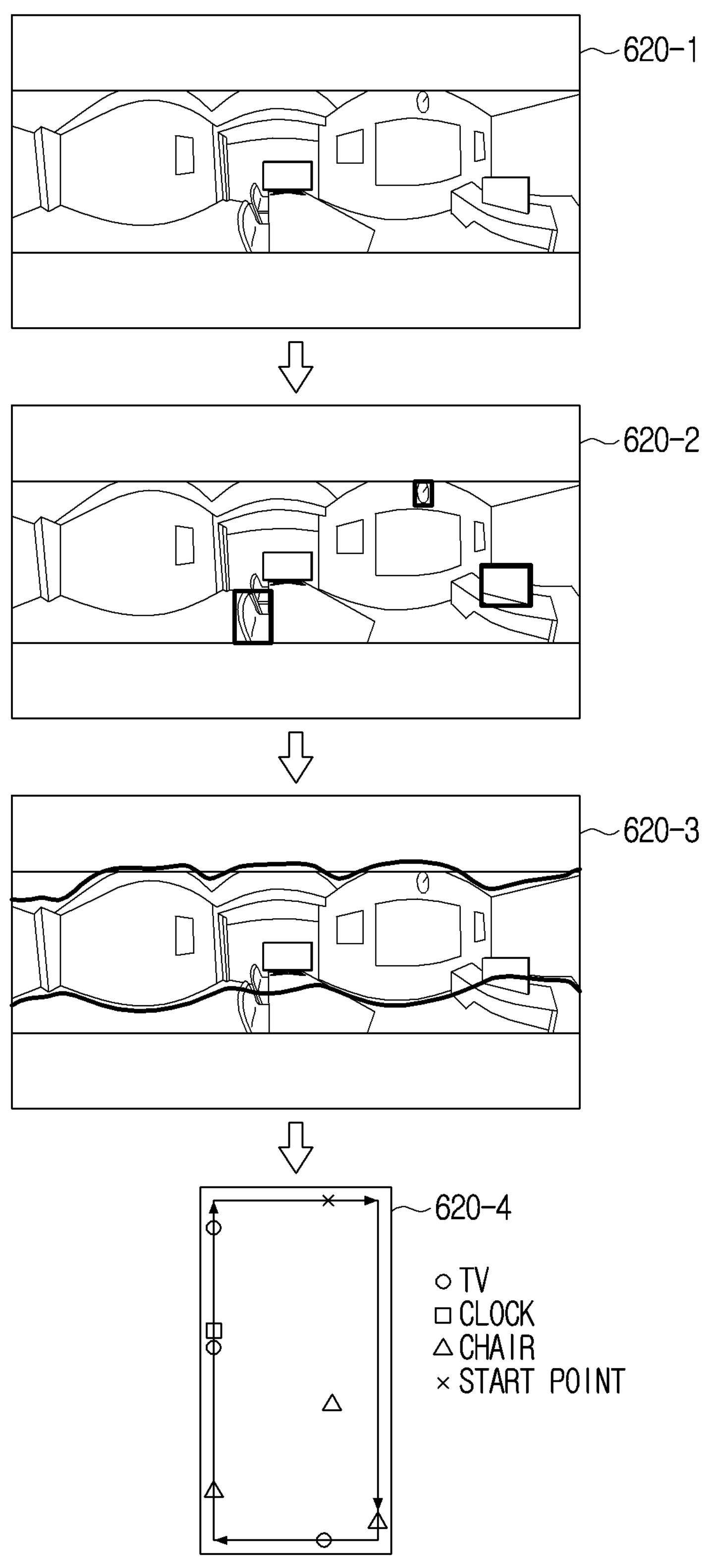
FIG. 6B is a diagram illustrating the floor map generation method through panorama scan according to another embodiment.
Figure 6C:
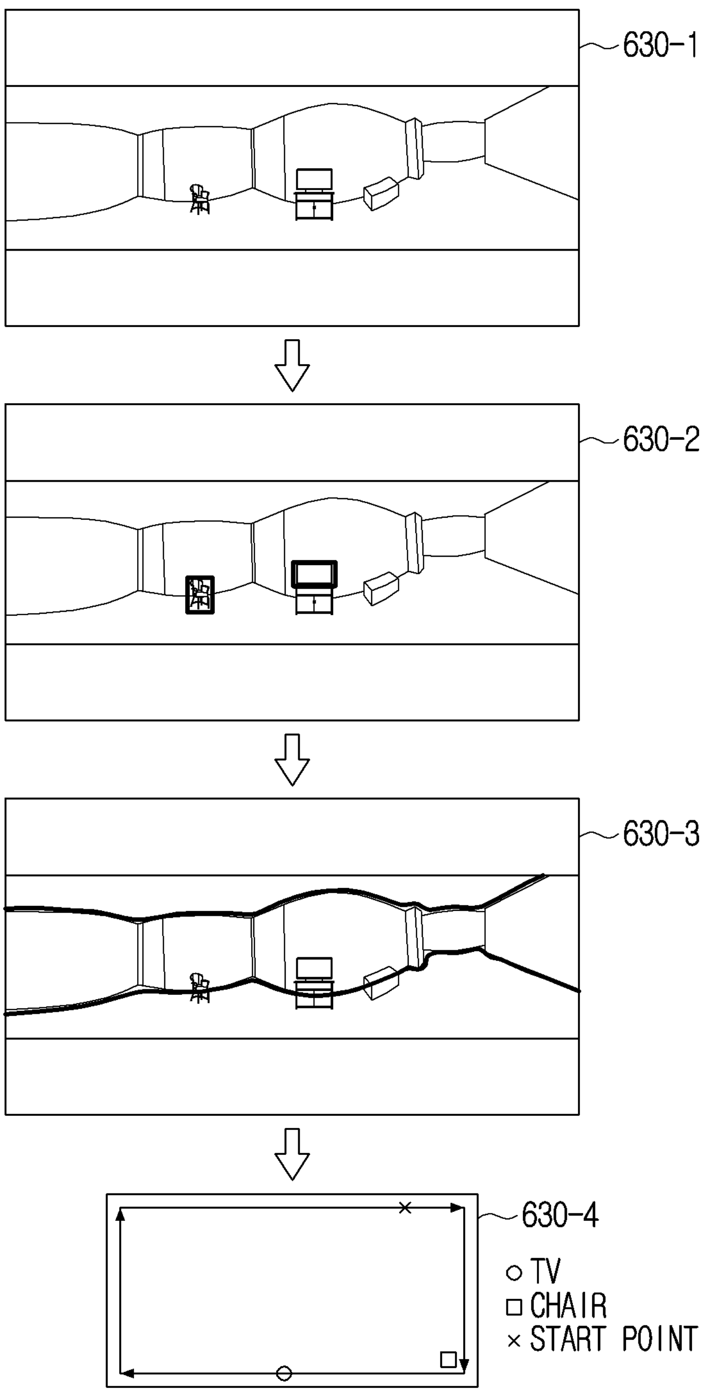
FIG. 6C is a diagram illustrating the floor map generation method through panorama scan according to another embodiment.

FIGS. 6B and 6C are diagrams illustrating the floor map generation method through panorama scan according to another embodiment.

By the same method as in one embodiment described above referring to FIG. 6A, the processor 190 may obtain panorama images 620-1 and 630-1, identification information 620-2 and 630-2 for devices and objects, and information 620-3 and 630-3 on a boundary line between a wall and a ceiling and a boundary line between the wall and a floor, and curve information of the panorama images 620-1 and 630-1.

From the curve information obtained based on the information 620-3 and 630-3 on the boundary line between the wall and the ceiling and the boundary line between the wall and the floor obtained from the panorama image 620-1 and 630-1 from the specific region, as it is an area with a large curve of the boundary line, the processor 190 may calculate an actual width of the corresponding area to be smaller than a width of the area included in the panorama image 620-1 and 630-1. In addition, as it is an area with a small curve of the boundary line in the specific region, the processor 190 may calculate an actual width of the corresponding area to be larger than a width of the area included in the panorama image 620-1 and 630-1. The processor 190 may generate floor maps 620-4 and 630-4 for the specific region having a rectangular shape based on a calculation value for the obtained width of the specific region. The floor maps 620-4 and 630-4 generated in the same manner as in one embodiment described above according to FIG. 6A may include one or more icons corresponding to devices or objects, and may include a start point icon showing a point where the camera 120 starts the panorama scan and arrows showing information on the continuous capturing direction in the panorama scan process of the camera 120.

Figure 7:
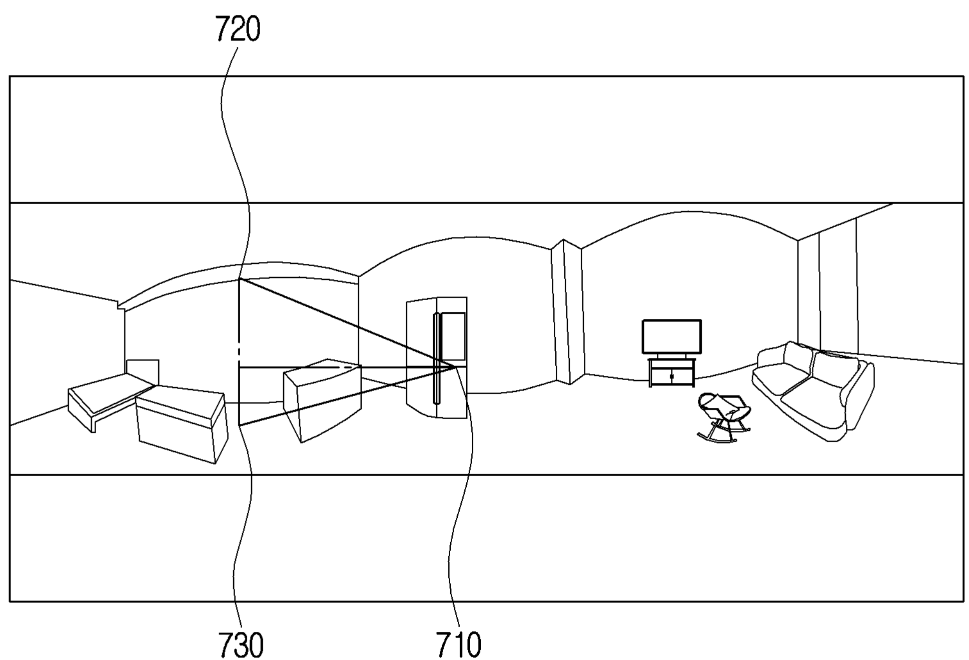
FIG. 7 is a diagram illustrating the floor map generation method through panorama scan according to various embodiments.

FIG. 7 is a diagram illustrating the floor map generation method through panorama scan according to various embodiments.

Referring to FIG. 7, the processor 190 may set a first random point 720 existing on the boundary line between the wall and the ceiling on the obtained panorama image, obtain a second point 730 on which a virtual line orthogonal to the floor of the specific region and passing through the corresponding first random point 720 meets the floor of the specific region, and a third random point 710 corresponding to the location of the camera 120 on the panorama image. Herein, a height of the third random point 710 from the floor of the specific region may be a predetermined random value (e.g., 1.6 m), but may be set to various values, without limitation. The processor 190 may obtain a first virtual straight line which passes the third point 710 and the first point 720 and a second virtual straight line which passes the third point 710 and the second point 730, and may obtain a third virtual straight line parallel with the floor of the specific region on the third random point 710 corresponding to the location of the camera 120 on the panorama image. The processor 190 may obtain a first angle value formed by the first straight line and the third straight line and obtain a second angle value formed by the second straight line and the third straight line. The processor 190 may obtain a third-dimensional coordinate value of the second point 730 in an actual specific region based on a distance between the floor on the panorama image and the third point 710 on the panorama image corresponding to the height value of the camera 120 from the predetermined floor and the second angle value. The processor 190 may obtain a coordinate value of the first point 720 in the actual specific region based on the third-dimensional coordinate value of the second point 730 in the actual specific region and the first angle. The processor 190 may obtain third-dimensional coordinate values of all points existing on a boundary line where the wall and the ceiling meet each other and third-dimensional coordinate values of all points existing on a boundary line where the wall and the floor meet each other, obtain information on a width of the specific region, a height of the specific region, and a size of the specific region, and generate a floor map including the obtained information.

Figure 8:
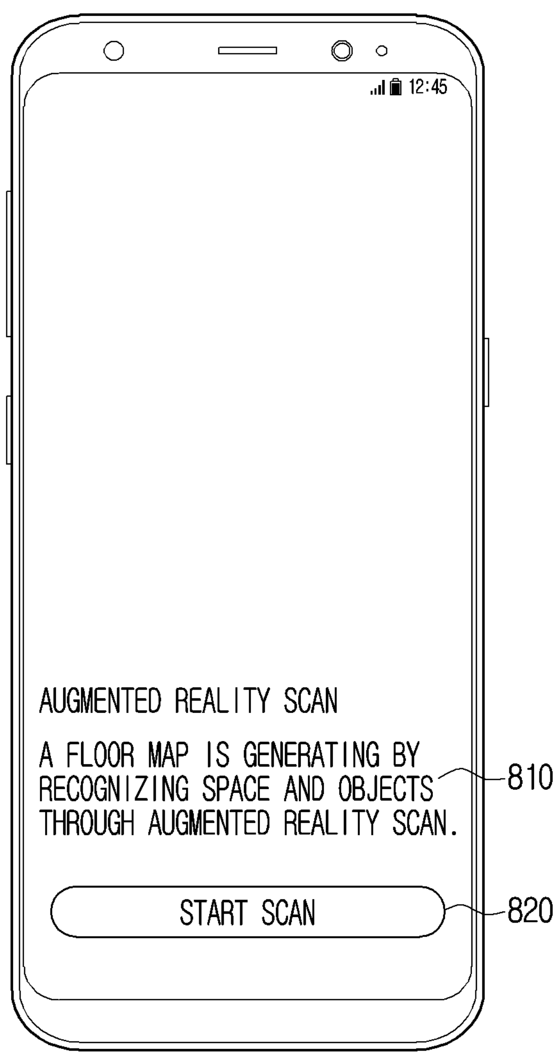
FIG. 8 is a diagram illustrating the floor map generation method through augmented reality scan according to various embodiments.

FIG. 8 is a diagram illustrating the floor map generation method through augmented reality scan according to various embodiments.

Based on the input of the first user command being received through the GUIs 310, 320, 330, and 340 formed of the basic specific region items of the living room, the bedroom, the kitchen, and the bath room or the GUI 350 for generating a new specific region other than the basic specific regions on the initial screen for the floor map generation according to FIG. 3, the processor 190, referring to FIG. 8, may display guide information 810 for augmented reality scan on the display 150 before the camera 120 performs the augmented reality scan operation. The guide information 810 is not limited to the above sentence and may include other guide sentence. In addition, the processor 190 may display a GUI 820 capable of receiving an input of a user command for the augmented reality scan start on the same screen. Based on the input of the user command for the augmented reality scan start being received through the GUI 820, the processor 190 may control the camera 120 so that the camera 120 performs the augmented reality scan operation. In addition, the processor 190 may receive an input of the user command for the augmented reality scan start in a form of the user gesture or the user's voice through the sensor 140.

Figure 9:
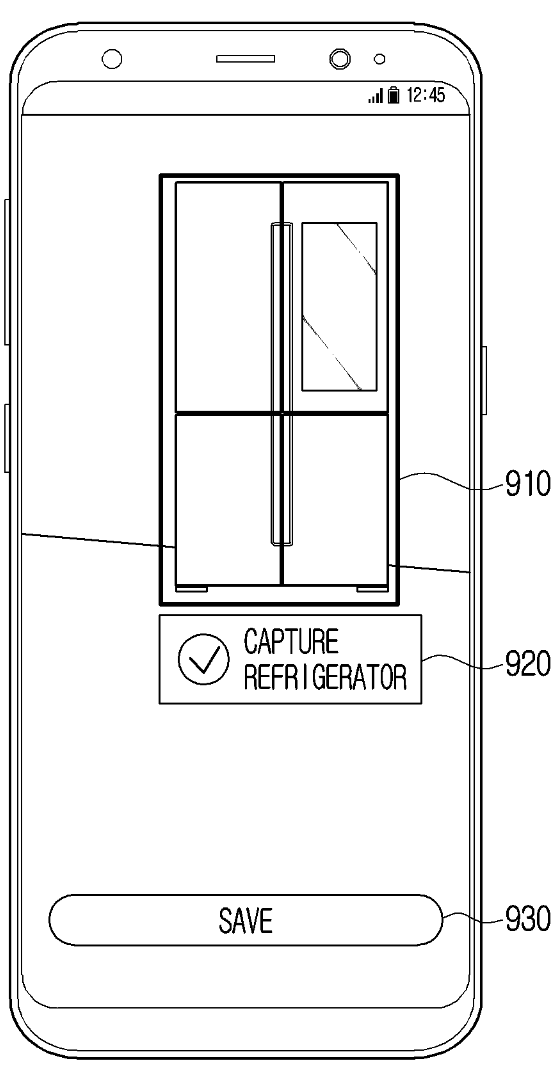
FIG. 9 is a diagram illustrating the floor map generation method through augmented reality scan according to various embodiments.

FIG. 9 is a diagram illustrating the floor map generation method through augmented reality scan according to various embodiments.

Referring to FIG. 9, the processor 190 may identify a device based on pre-trained data based on scan of devices existing in the specific region of the camera 120. The processor 190 may display an outline 910 on a circumference of the identified device on the display 150 in a state where the augmented reality scan screen is displayed on the display 150, and display information 920 indicating that the device is identified on the display 150. The processor 190 may identify the device, obtain information on the device, and display the information on the display 150. The information on the device may be stored in the memory 160 or the external server. Based on the information on the device being displayed on the display 150, the processor 190 may receive an input of the second user command through a GUI 930, and based on the second user command being input, the processor 190 may generate a floor map on the specific region based on the identification information and the arrangement information for the identified device.

Figure 10:
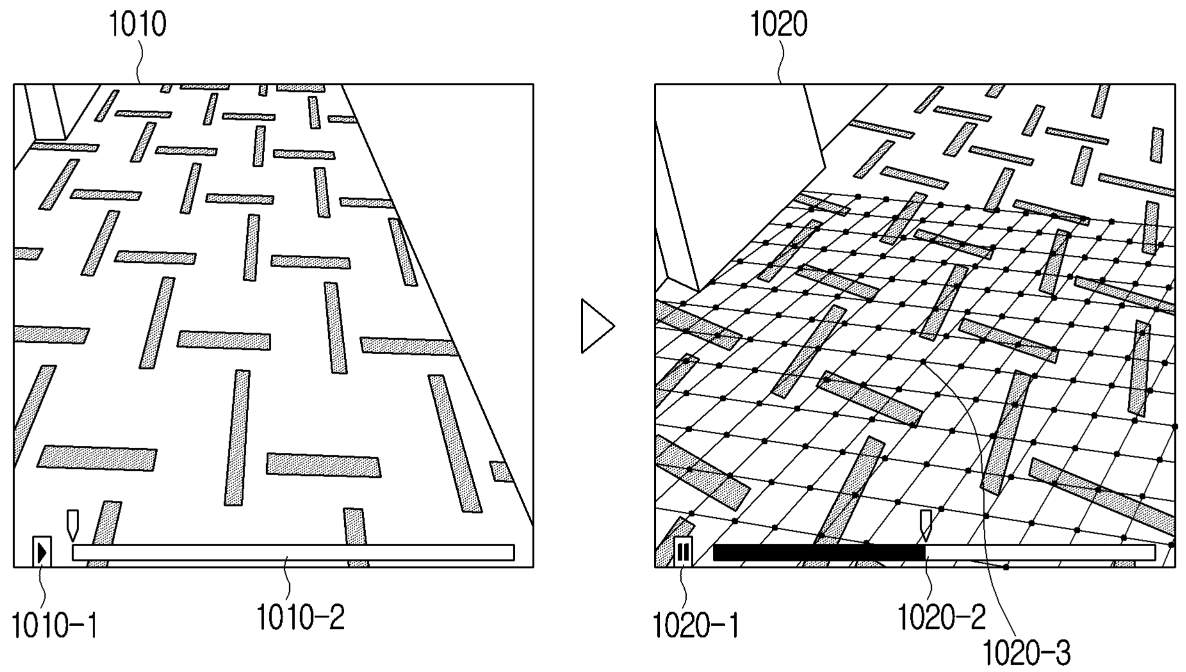
FIG. 10 is a diagram illustrating the floor map generation method through floor scan according to various embodiments.

FIG. 10 is a diagram illustrating the floor map generation method through floor scan according to various embodiments.

Referring to FIG. 10, the processor 190 may obtain a floor image 1010 through the floor scan of the specific region of the camera 120. The processor 190 may display a GUI 1010-1 for receiving an input of a user command for floor pattern analysis on the display 150 with a floor image, and display a progress bar 1010-2 indicating a floor pattern analysis progress state on the display 150. Based on the user command being input through the GUI 1010-1, the processor 190 may display a floor pattern analysis screen 1020, the GUI 1020-1 for receiving an input of a user command for stopping the floor pattern analysis, and a progress bar 1020-2 corresponding to the progress state of the floor pattern analysis on the display 150. The specific region floor scan of the camera 120 and the floor pattern analysis of the processor 190 may be included in the augmented reality scan through the camera 120 and the augmented reality image analysis process of the processor 190.

The processor 190 may obtain information on the area of the floor, the size of the floor, and the shape of the floor based on the pattern analysis information of the floor, and obtain information on the size and the shape of the specific region based on this.

In addition, the processor 190 may obtain the info on the size and the shape of the specific region based on a route of the camera 120 and a shape of a wall recognized through the camera 120.

Figure 11:
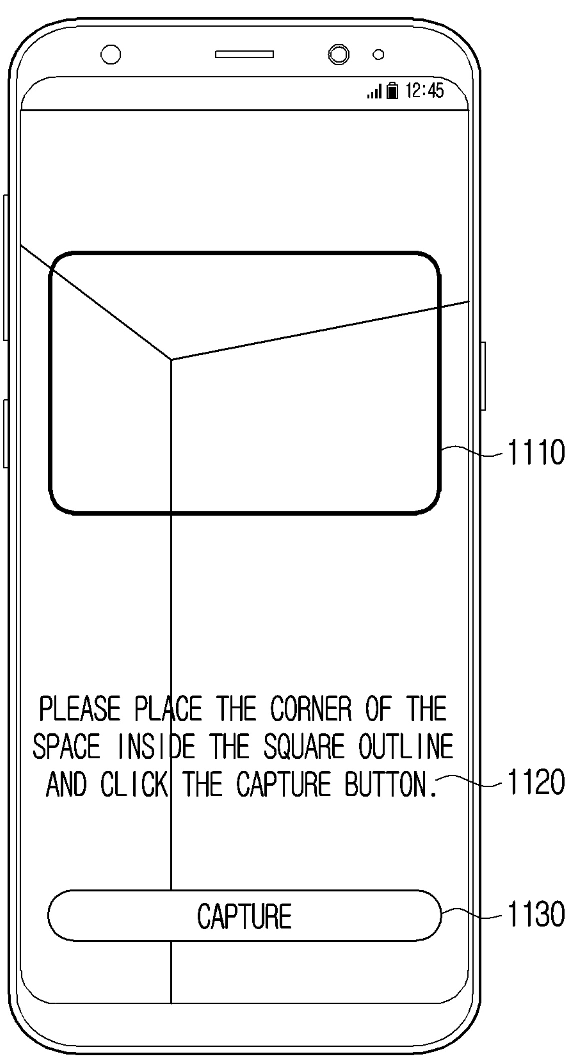
FIG. 11 is a diagram illustrating the floor map generation method through corner recognition of a specific region according to various embodiments.

FIG. 11 is a diagram illustrating the floor map generation method through corner recognition of a specific region according to various embodiments.

Referring to FIG. 11, the processor 190 may recognize a corner of the specific region through the camera 120. Herein, the corner of the specific region refers to a point where two different walls and a ceiling adjacent to each other meet. Based on the corner of the specific region being located in a certain region displayed as an outline 1110 on the display 150, the processor 190 may recognize the corner of the specific region through the camera 120. In this case, the processor 190 may also display guide information 1120 for the corner recognition on the display 150. The guide information 1120 illustrated in FIG. 11 is merely an embodiment and the processor 190 may display another guide information on the display 150.

In addition, based on the corner of the specific region being located in the outline 1110, the processor 190 may receive an input of a user command for obtaining the corner recognition information through a GUI 1130. The processor 190 may recognize a plurality of corners through the camera 120. The processor 190 may obtain information on a basic shape of the specific region by recognizing the corner through the camera 120 as illustrated in FIG. 11 and generate a floor map including the obtained information.

Figure 12:
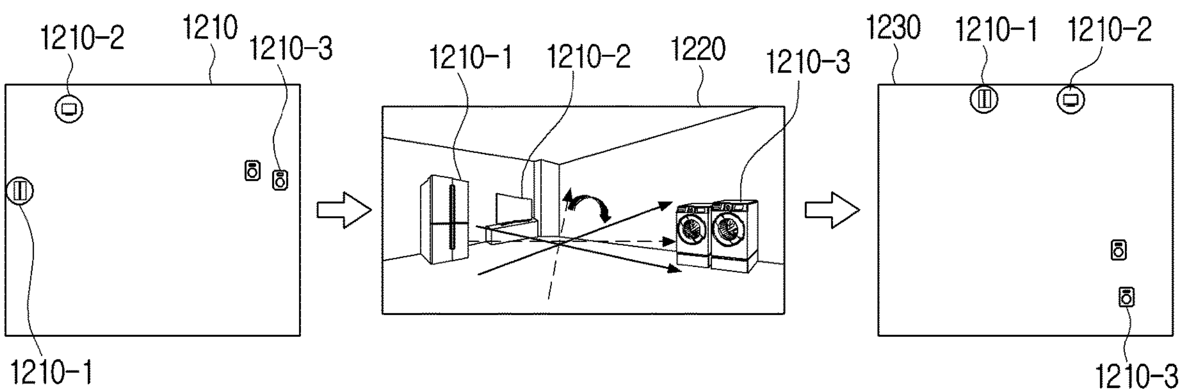
FIG. 12 is a diagram illustrating the floor map generation method through a corner rotation method according to various embodiments.

FIG. 12 is a diagram illustrating the floor map generation method through a corner rotation method according to various embodiments.

Referring to FIG. 12, the processor 190 may obtain an augmented reality image through the augmented reality scan of the camera 120 and obtain a floor map 1210 including icons corresponding to a refrigerator 1210-1, a TV 1210-2, and a washing machine 1210-3. Herein, in the augmented reality image obtaining and floor map generating process of the processor 190, a problem may occur that the locations of actual devices do not match with arrangement locations of icons corresponding to the devices on the floor map, and such a problem may be corrected by the corner rotation method. The processor 190 may set a random point at the center of the specific region shown on the obtained augmented reality image 1220, rotate the recognized specific region and devices on the obtained image around a virtual axis that vertically passes through the floor of the specific region obtained by the augmented reality image 1220 while passing through the set random point, and obtain a floor map 1230 including actual locations of the devices.

Figure 13:
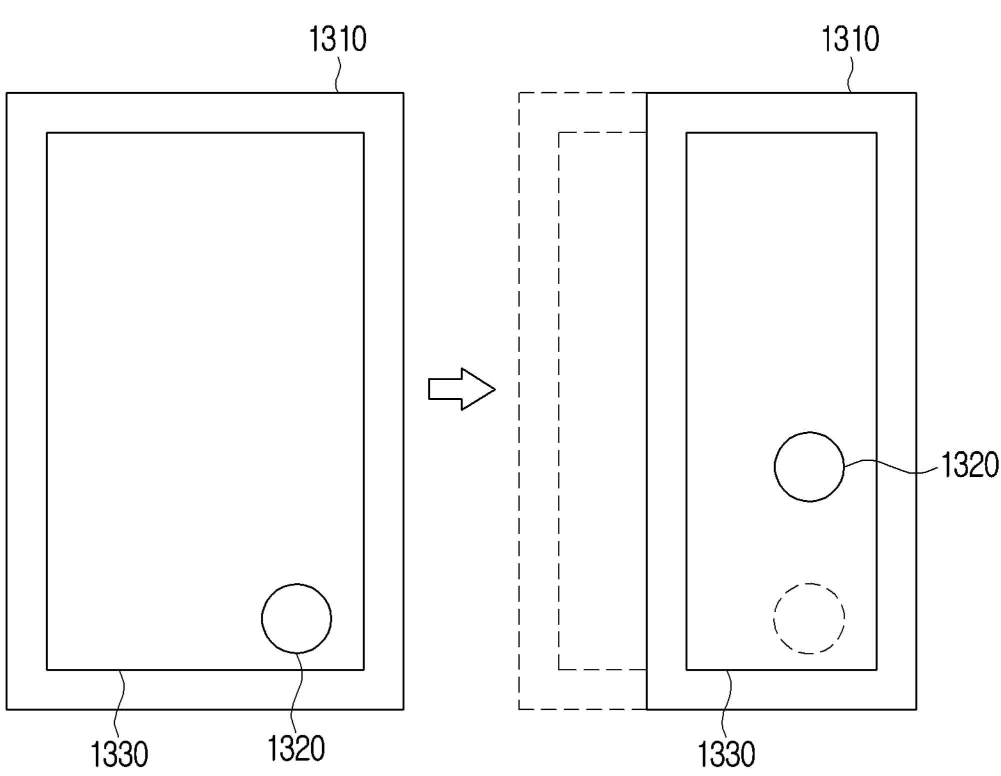
FIG. 13 is a diagram illustrating a floor map correction method according to an embodiment.

FIG. 13 is a diagram illustrating a floor map correction method according to an embodiment.

Referring to FIG. 13, the floor map generated by the processor 190 may include an outline 1310 showing the information on the size and the shape of the specific region and an icon 1320 showing the arrangement information of the device, and the processor 190 may correct the information on the size and the shape of the specific region based on user's dragging for the outline 1310 of the specific region and correct the arrangement information of the device based on the user's dragging for the icon 1320. The processor 190 may receive an input of the user command for correcting the floor map by a method of the user gesture or the user's voice through the sensor 140.

The floor map according to various embodiments of the disclosure may be displayed on the display 150 of the electronic apparatus 100 or the external electronic apparatus 200, and may be displayed with information on a temperature of the specific region, quality of the air in the specific region, and lighting of the specific region on the displayed map.

For the information on the temperature of the specific region, the processor 190 may display an outline inner region 1330 of the specific region in a random color on the floor map. The random color of the outline inner region 1330 of the specific region on the floor map may include red, orange, yellow, green, blue, and purple. As the temperature of the specific region is high, the processor 190 may display the random color of the outline specific region 1330 of the specific region on the floor map as a reddish color, and as the temperature of the specific region is low, the processor may display the color of the corresponding specific region on the floor map as a bluish color.

The processor 190 may display the information on the quality of the air in the specific region as one item of a plurality of items formed of excellent, normal, bad, and the like on the floor map.

The processor 190 may display the information on the lighting of the specific region as one item of a plurality of items formed of on and off on the floor map.

A method for displaying the information on the temperature of the specific region, the quality of the air in the specific region, and the lighting of the specific region on the floor map by the processor 190 is not limited to the above embodiment, and may be implemented by various methods such as a color, a character, a picture, an icon, and the like.

Figure 14:
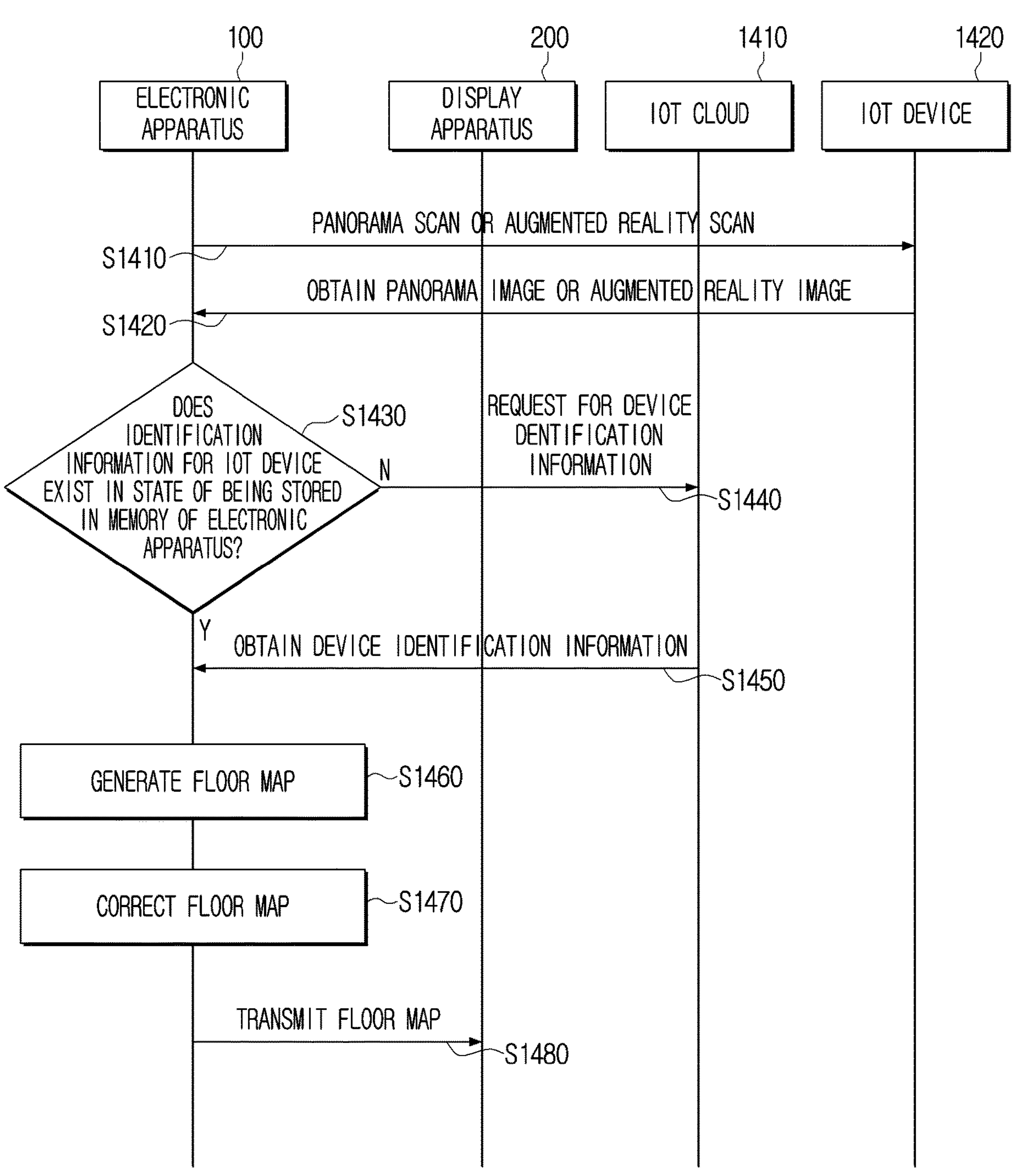
FIG. 14 is a sequence diagram illustrating operations of interaction between an electronic apparatus, a display apparatus, an IoT cloud, and an IoT device for floor map generation according to various embodiments.

FIG. 14 is a sequence diagram illustrating operations of interaction between an electronic apparatus, a display apparatus, an IoT cloud, and an IoT device for floor map generation according to various embodiments.

Referring to FIG. 14, the electronic apparatus 100 may obtain a panorama image or an augmented reality image through the panorama scan or the augmented reality scan (S1410) for an IoT device 1420 of the camera 120 (S1420).

The electronic apparatus 100 may identify the IoT device 1420 through the obtained image. Based on information on the identified IoT device 1420 being not stored in the memory 160 of the electronic apparatus (S1430-N), the electronic apparatus 100 may request for identification information for the IoT device 1420 to an IoT cloud 1410 (S1440) and the electronic apparatus 100 may obtain the identification information for the IoT device 1420 (S1450). The electronic apparatus 100 may generate a floor map based on the identification information for the IoT device 1420 (S1460) and correct the floor map by receiving an input of a user command (S1470). The electronic apparatus 100 may transmit information on the floor map to the external electronic apparatus 200 through the communication interface 170, thereby displaying the floor map on the external electronic apparatus 200.

The electronic apparatus 100 may display the IoT device 1420 on the floor map through a new device registration procedure for the IoT device 1420 that is not stored or registered in the electronic apparatus 100 or the IoT cloud 1410.

The electronic apparatus 100 may identify the IoT device 1420 through the scan of the camera 120 and generate a floor map by arranging the identified IoT device 1420 at a random location on the floor map. After generating the floor map, the electronic apparatus 100 may display the IoT device 1420 on the floor map through the new device registration procedure. Specifically, the electronic apparatus 100 may search for the IoT device 1420 by Soft AP or BLE, and the electronic apparatus 100 may perform communication connection with the IoT device 1420 through Wi-Fi or Bluetooth and perform Wi-Fi and cloud account setting operation. In this case, the electronic apparatus 100 or the external electronic apparatus 200 may perform an account setting operation by obtaining information indicating whether the IoT device 1420 exists in the same specific region as the electronic apparatus 100 or the external electronic apparatus 200 based on a signal such as IR or ultrasonic waves. Based on the IoT device 1420 being registered on the IoT cloud 1410, the electronic apparatus 100 may perform a control operation for the IoT device 1420 arranged on the floor map. The electronic apparatus 100 transmit information on the account setting to the external electronic apparatus 200 and the external electronic apparatus 200 may display the information on the account setting.

The new device registration procedure described above is not limited to the embodiment in which the electronic apparatus 100 generates the floor map and displays the IoT device 1420 on the floor map through the new device registration procedure, and may be implemented as another embodiment in which the electronic apparatus 100 performs the new device registration procedure and then generates the floor map based on the registered new IoT device 1420.

Herein, the registration of the new IoT device 1420 may be performed by a method in that a pre-registered IoT device 1420 detects and recognizes a new IoT device 1420.

Herein, the arrangement of the IoT device 1420 may be performed by an input of a user command or may be performed through an operation process of the processor without a user command based on identification information and location information showing the accurate location of the IoT device 1420.

Figure 15:
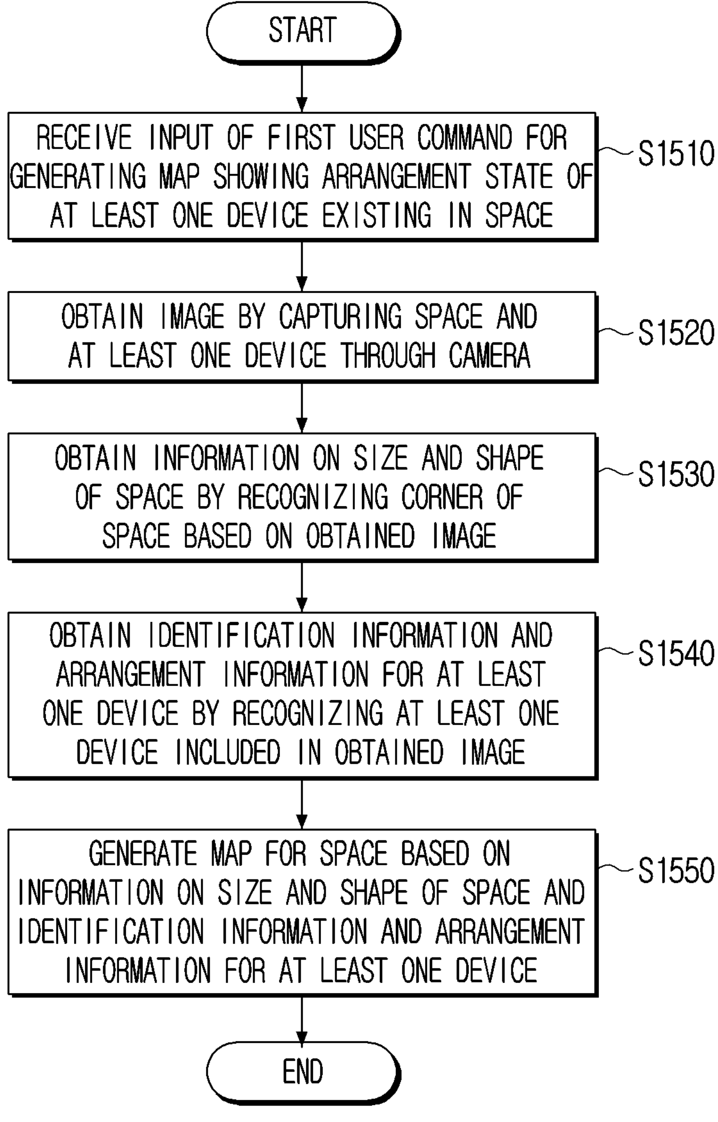
FIG. 15 is a flowchart illustrating an operation method of an electronic apparatus according to an embodiment.

FIG. 15 is a flowchart illustrating an operation method of an electronic apparatus according to an embodiment.

Referring to FIG. 15, the electronic apparatus 100 may receive an input of a first user command for generating a map showing an arrangement state of at least one device existing in the specific region (S1510). The electronic apparatus 100 may receive the input of the first user command through the GUIs 310, 320, 330, 340, and 350 displayed on the display 150. Based on the first user command being input, the electronic apparatus 100 may obtain an image by capturing the specific region and the at least one device through the camera 120 (S1520). The image obtained by the electronic apparatus 100 may include a panorama image or an augmented reality image. The electronic apparatus 100 may obtain information on a size and a shape of the specific region by recognizing a corner of the specific region based on the obtained image (S1530). The electronic apparatus 100 may obtain information on a height of the specific region, a width of the specific region, and a size of the specific region by obtaining curve information of the panorama image based on the obtained panorama image, and obtain information on an area of a floor and a shape of the floor by performing floor pattern analysis based on the augmented reality image. The electronic apparatus 100 may obtain the identification information and the arrangement information for the at least one device by recognizing the at least one device included in the obtained image (S1540). The electronic apparatus 100 may generate a floor map for the specific region based on the information on the size and the shape of the specific region and the identification information and the arrangement information for the at least one device (S1550). The floor map may include information on a temperature of the specific region, quality of the air in the specific region, and lighting of the specific region and may be corrected by a user input. In addition, based on the external electronic apparatus 200 displaying the floor map, the electronic apparatus 100 may transmit a floor map correction command to the external electronic apparatus 200 and the external electronic apparatus 200 may display a corrected floor map.

In addition, the floor map generation method of the electronic apparatus 100 is not limited to the method based on the image obtaining through the camera 120 of the electronic apparatus 100 described above. Specifically, the floor map generation method may include a method in that the electronic apparatus 100 generates a random floor map including a size of a basic specific region, arrangement of the basic specific region, a shape of the basic specific region, and identification information and arrangement information of devices as a basic floor map and the electronic apparatus 100 generates a floor map by receiving an input of a user command such as a user's touch or user's dragging through the user interface 110.

Regarding the map generation process according to another embodiment of the disclosure, the electronic apparatus 100 merely receives/outputs information related to the map generation and the specific map generation process may be performed on an external server, except for a case where the electronic apparatus 100 is implemented alone.

In addition, the map generation process according to still another embodiment of the disclosure may include a case where the electronic apparatus 100 and an external server generate a map through data transmission and reception. Herein, the electronic apparatus 100 may receive an input of a user command through the user interface 110 or the microphone 130 and output information on a map generation process and a map generation result through the display 150 or a speaker (not illustrated). The external server may obtain information on a specific region corresponding to the user input by performing communication connection from the electronic apparatus 100, recognize the specific region or identify a device based on the obtained information, and perform an operation of generating a map. The external server may perform the communication connection with the electronic apparatus 100 or the external electronic apparatus 200 to output the map generated through the electronic apparatus 100 or the external electronic apparatus 200 to be provided to the user.

According to an embodiment of the disclosure, various embodiments of the disclosure described above may be implemented as software including instructions stored in machine (e.g., computer)-readable storage media. The machine is a device capable of calling the instructions stored in the storage medium and operating according to the called instructions and may include a device according to the disclosed embodiment. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory storage medium" is tangible and may not include signals (e.g., electromagnetic wave), and this term does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed on line (e.g., downloaded or uploaded) through an application store (e.g., PlayStore™) or directly between two user devices (e.g., smartphones). In a case of the on-line distribution, at least a part of the computer program product (e.g., downloadable app) may be at least temporarily stored or temporarily generated in a machine-readable storage medium such as a memory of a server of a manufacturer, a server of an application store, or a relay server.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:

a user interface;

a camera;

a memory; and a processor configured to:

based on a user request being input through the user interface, obtain an image, captured through the camera, corresponding to a specific region and at least one device;

obtain information corresponding to the specific region and identification information and arrangement information for the at least one device included in the image based on the image; and generate a map to be displayed as geometric representations without the image captured through the camera, the generated map corresponding to the arrangement information for the at least one device in the specific region based on the information corresponding to the specific region, the identification information and the arrangement information for the at least one device, wherein the map includes an outline corresponding to a size and a shape of the specific region in a top view and an icon corresponding to the identification information and the arrangement information for the at least one device.

2. The electronic apparatus according to claim 1, wherein the processor is configured to obtain a panorama image of the specific region and the at least one device by panorama scan through the camera.

3. The electronic apparatus according to claim 2, wherein the processor is configured to:

obtain curve information of the panorama image; and obtain information associated with a shape of the specific region by recognizing at least one of a corner of the specific region, a height of the specific region, and a width of the specific region based on the obtained curve information of the panorama image.

4. The electronic apparatus according to claim 3, wherein the processor is configured to:

based on the curve information of the panorama image, as a region showing a first curvature in the specific region, obtain an actual width of the region to be smaller than a width of the region which is included in the panorama image; and based on the curve information of the panorama image, as a region showing a second curvature in the specific region, obtain the actual width of the region to be greater than the width of the region which is included in the panorama image.

5. The electronic apparatus according to claim 1, wherein the processor is configured to:

obtain an augmented reality image of the specific region and the at least one device by augmented reality scan through the camera.

6. The electronic apparatus according to claim 5, wherein the processor is configured to:

obtain information associated with a corner of the specific region by performing the augmented reality scan of the corner of the specific region through the camera;

based on information of a floor of the specific region being scanned through the camera, obtain information associated with an area of the floor and a size and a shape of the specific region based on a pattern of the floor; and obtain the information associated with the size and the shape of the specific region based on a route of the camera while the image corresponding to the specific region is captured and a shape of a wall recognized through the camera.

7. The electronic apparatus according to claim 6, wherein the processor is configured to generate a map at a visual angle of a user by a corner rotation method for setting a random point at a center of the specific region obtained as the augmented reality image and rotating the specific region or the at least one device in the obtained image around a virtual axis that vertically passes through the floor of the specific region obtained as the augmented reality image while passing through the random point.

8. The electronic apparatus according to claim 7, wherein the user request is a first user request and the map is a first map and the processor is configured to:

based on the at least one device being scanned through the camera, perform control to output information associated with the at least one device by identifying the at least one device based on pre-trained data; and based on a second user request corresponding to the output information being input, provide a second map corresponding to the specific region based on identification information and arrangement information for the at least one device.

9. The electronic apparatus according to claim 1, further comprising:

a display, wherein the processor is configured to control the display to output a map, and wherein the output map comprises at least one of information associated with a temperature of the specific region, a quality of air in the specific region, and a lighting of the specific region.

10. The electronic apparatus according to claim 1, further comprising:

wherein the map comprises an outline showing information associated with a size and a shape of the specific region and the icon showing arrangement information of the at least one device, and wherein the processor is configured to correct the information associated with the size and the shape of the specific region based on user's dragging of the outline of the specific region, and correct the arrangement information of the at least one device based on user's dragging of the icon.

11. A method for controlling an electronic apparatus, the electronic apparatus including a user interface, a camera, and a memory, the method comprising:

based on a user request being input through the user interface, obtaining an image, captured through the camera, corresponding to a specific region and at least one device;

obtaining information corresponding to the specific region and identification information and arrangement information for the at least one device included in the image based on the image; and generating a map to be displayed as geometric representations without the image captured through the camera, the generated map corresponding to the arrangement information for the at least one device in the specific region based on the information corresponding to the specific region, the identification information and the arrangement information for the at least one device, wherein the map includes an outline corresponding to a size and a shape of the specific region in a top view and an icon corresponding to the identification information and the arrangement information for the at least one device.

12. The method according to claim 11, wherein the obtaining the image comprises:

obtaining a panorama image of the specific region and the at least one device by panorama scan through the camera.

13. The method according to claim 12, wherein information associated with a size and a shape of the specific region is obtained and the obtaining comprises:

obtaining curve information of the panorama image; and obtaining information associated with a shape of the specific region by recognizing at least one of a corner of the specific region, a height of the specific region, and a width of the specific region based on the obtained curve information of the panorama image.

14. The method according to claim 13, wherein the obtaining the information associated with the size and the shape of the specific region comprises:

based on the curve information of the panorama image, as a region showing a first curvature in the specific region, obtaining an actual width of the region to be smaller than a width of the region which is included in the panorama image; and based on the curve information of the panorama image, as a region showing a second curvature in the specific region, obtaining the actual width of the region to be greater than a width of the region which is included in the panorama image.

15. The method according to claim 11, wherein the obtaining the image comprises obtaining an augmented reality image of the specific region and the at least one device by augmented reality scan through the camera.

* * * * *